United States Patent Office 2,699,381
Patented Jan. 11, 1955

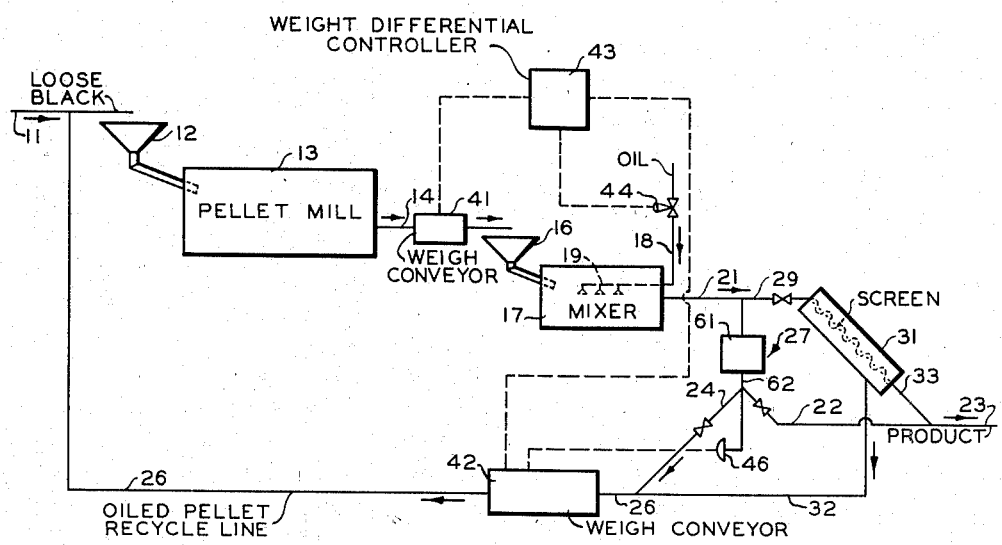
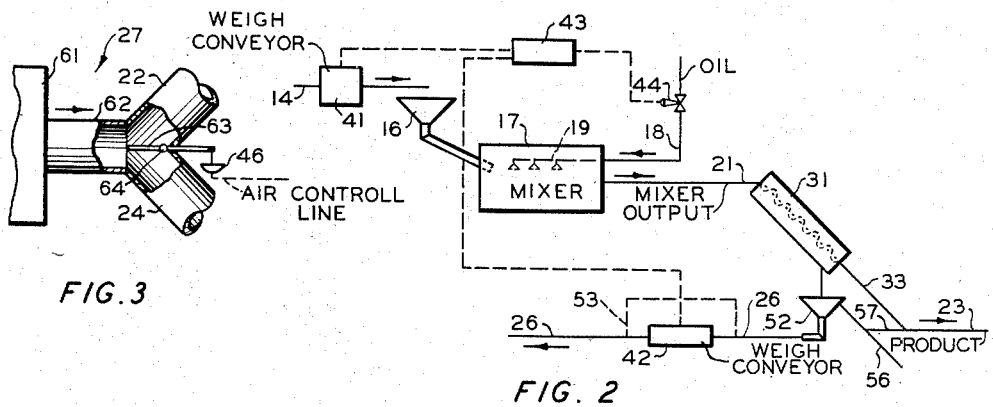

2,699,381

OIL PELLETING OF CARBON BLACK

William R. King, Bartlesville, Okla., assignor to Phillips Petroleum Company, a corporation of Delaware Application August 28, 1953, Serial No. 377,078

15 Claims. (Cl. 23—314)

This invention relates to a process for pelleting loose carbon black and to apparatus for effecting improved pelleting of carbon black. A specific aspect of the invention pertains to a process for controlled oiling of carbon black pellets and to apparatus for automatically impregnating carbon black pellets with a constant weight of oil.

It is desirable to pellet loose carbon black for various reasons, including ease and cleanliness in handling and economy effected by condensing the black. The pelleting process is usually effected in horizontally elongated, cylindrical drums which are rotated in order to tumble or roll particles of black on their way through the mill and form nuclei which pick up finer particles of carbon black and gradually form small pellets. Utilizing a pellet mill approximately 48' in length and 6' in diameter, it has been found to be impossible to operate the mill at a greater bed depth than a depth in the range of 12 to 24" (depending upon the type of loose black being pelleted) because of the tendency of the pellets to go to loose black under the added weight of a greater depth of pellets in the mill. It has also been found that the rate of production of a pellet mill of this type is approximately proportional to the square of the depth of the bed, which means that doubling the depth of the bed in the pellet mill quadruples the production rate of the mill. Hence, the tremendous advantage of a process which permits operation with greater bed depth is obvious.

The invention has several objects, which include: (1) To provide an improved process for producing carbon black pellets; (2) to provide an improved process for producing oiled carbon black pellets; (3) to provide a carbon black pelleting process which permits the use of greater bed depths in the mill; (4) to provide a process for automatically controlling the proportion of recycled pellets and also the proportion of oil introduced to the formed pellets; (5) to provide a novel arrangement of pelleting apparatus; (6) to provide an arrangement of apparatus which automatically controls the weight of pellets recycled to a pellet mill and the rate of flow of oil to the pellets egressing from the pellet mill. Other objects of the invention will become apparent from a consideration of the accompanying disclosure.

In the pelleting of carbon black, attempts have been made to simultaneously pellet loose black and impregnate the pellets with oil, but such attempts have not met commercial success. The oiling of carbon black pellets is highly desirable in order to impart to the pellets greater flowability, less dusting and breakage of pellets, and also to include in the carbon black desirable proportions of extender oil for use in the rubber industry to which goes a great deal of the carbon black of the carbon black industry. A successful method of producing oiled pellets involves the separate pelleting of loose carbon black in a pelleting mill, feeding the effluent pellets to a second mill or mixing chamber, and introducing to the mixing chamber a regulated amount of oil which impregnates the pellets with a constant weight proportion of oil. In such a process, it has been proposed to recycle some of the dry pellets from the pellet mill to the inlet end of the mill, along with the loose black being fed thereto, in order to facilitate the pelleting process.

I have found that the recycle of oiled pellets, from downstream of the mixer in which the impregnation step is performed, to the inlet of the pellet mill effects a vast improvement in the pelleting process over the recycling of dry pellets to the pellet mill. Recycling of oiled pellets instead of dry pellets, as is conventionally practiced, allows operation at considerably greater bed depths in the pellet mill than have heretofore been found operable without causing the bed to go to loose black, and it also permits considerably faster rotation of the pellet mill than has heretofore been found permissible. Operation at greater bed depths increases the rate of production appreciably and provides less milling of the black, which improves the quality of the resulting carbon black pellets for use in rubber for automobile tires and other applications.

Operation according to the invention produces stronger pellets thereby rendering it feasible to produce a lower density pellet which will withstand shipping without destruction as well as a dry pellet of higher density. For example, where a dry pellet of 24#/ft.³ density is being produced in order to withstand shipping without breakage so as to have good unloading and handling properties, my process can be operated so as to produce oiled pellets of 22#/ft.³ density which will withstand shipping and have better unloading and handling characteristics than the dry, heavier pellets. The oiled pellets of 22#/ft.³ density also impart higher abrasion resistance to rubber. In addition reducing the density of the pellet product substantially increases production more than the proportional decrease in density.

While I do not wish to be bound by any theory as to the reason, or reasons, why recycling of oiled pellets to the pellet mill effects these advantages over recycling of dry pellets, it appears that the results are at least partly due to the fact that the oiled pellets are more resistant to going to loose black under greater pressures and more vigorous agitation than are dry pellets. Another factor which apparently influences the pelleting process and permits faster pelleting is the nature of the oiled pellet which has a greater affinity for particles of carbon black than do dry pellets. Another theory, which may or may not operate in the pelleting process, is that the oiled pellets accumulate loose black so fast in the pellet mill that they soon become so large that they disintegrate and thereby form great numbers of small nuclei which are effective in producing more pellets.

The recycling of oiled pellets to the pellet mill has another unobvious advantage in that the nuclei formed by and from the oiled pellets are formed into large pellets which have the incorporated oil at their cores. Thereafter, the oiling of the pellets in the mixer impregnates the shell of unoiled carbon black on the outside and results in a more uniform distribution of oil in the pellets than is obtained with recycle of dry pellets. It should be apparent, also, that the resulting pellets are stronger than ones which are dry at the center. This applies, of course, only to pellets which are not completely saturated with oil, which requires between 40 and 45 weight per cent of oil. In other words, where oil in an amount substantially less than 40 weight per cent of the carbon black is incorporated in the pellets, it provides better distribution of the oil to recycle oiled pellets to the pelleting mill.

The invention is particularly applicable to the incorporation of from 3 to 30 weight per cent of oil in the pellets, although the amount utilized usually is in the range of 5–15 weight per cent. The preferred amount of extender oil is in the range of 7 to 9 per cent by weight.

In accordance with the invention, loose carbon black is fed to a pellet mill which produces small pellets by rotation and tumbling; the resulting pellets are fed to a mixing chamber, which may be in the form of a rotating horizontal cylindrical drum, where the pellets are sprayed with oil in a regulated amount so as to impregnate the pellets with a specific weight proportion of oil; a portion of the oiled pellets are recovered as product of the process; and another portion is recycled and fed to the pellet mill along with loose black. In effecting the process, the impregnation of the pellets with a predetermined weight proportion of oil is controlled by operation of a motor control valve in the oil line leading into the mixer in proportion to the amount of carbon black pellets passed to the mixer, with compensation for the oil already incorporated in the pellets by means of the recycle stream. The control is effected by weighing the total carbon black material passing from the pellet mill to the mixer, weighing or otherwise determining the weight of the pellets recycled, automatically subtracting the weight of the latter from the weight of the former, and transmitting these values to a controller which automatically controls the motor valve in the oil line in response to the variations in weight differential between the two carbon black streams. Another method of effecting the regulation of the oil flow and ultimate amount of oil impregnation entails feeding the oiled pellets from the pellet conveyor line downstream of the mixer in regulated amount, in terms of weight, to the recycle line, weighing the total carbon black stream between the mill and the mixer, and setting a controller instrument, which is in actuatable communication with the weighing device and in actuating communication with a motor control valve, so that the flow rate is regulated in accordance with variations in the total weight of pellets passing to the mixer. In another modification of the controls, a flow dividing device in the effluent product line from the mixer is set by a weigh conveyor in the recycle line so as to send a predetermined, constant weight of pellets to the recycle line. In turn, the weight conveyor transmits weight values to the differential weight controller, which also receives weight variations from the weigh conveyor in the conveyor line between the mill and the mixer, and regulates the motor control valve in the oil line in response to variations in the weight differential.

Any type of oil may be utilized in the spraying of the pellets in the mixer, but it is, of course, advantageous to utilize an oil, such as an extender oil, which includes in the pellets one of the desirable ingredients in compounding rubber. While the weight proportion of oil is desirably in the range of 7 to 15 percent, and more desirably in the range of 7 to 9 percent, the addition of oil in any quantity to the dry pellets, up to saturation, improves the pelleting process and is within the scope of the invention.

A more complete understanding of the invention may be had from a consideration of the drawing, of which:

Figure 1 is a flow plan of a schematic arrangement of apparatus for effecting the process of the invention;

Figure 2 is a flow plan of a modification of the invention utilizing another embodiment of the controls; and Figure 3 is a plan view of one modification of a flow proportioning device utilizable in the pellet effluent line from the mixer.

Referring to Figure 1, a conveyor 11 feeds loose black into a hopper 12, which delivers the carbon black to a pellet mill 13. Pellet mill 13 may be any suitable type of pelleting device which utilizes tumbling and rotation in forming carbon black pellets, but is preferably a horizontally elongated, cylindrical mill which receives black at one end and delivers pellets at the opposite end. Pellet mills of this type, and others to which the invention is applicable, are commercially available. The mill 13 delivers pellets to a conveyor line 14 which leads to a hopper 16, or similar device for delivering pellets to a mixing chamber 17. Mixer 17 is preferably a horizontally disposed revolving drum, similar in shape to the pellet mill, but may be considerably smaller and adequately handle pellets from the mill. Other types of mixing devices may be used which provide an agitated bed of pellets without unduly breaking or disintegrating the pellets.

Oil line 18 leads into mixer 17 and delivers oil to spraying device, or nozzles, 19 which are located above the pellet bed, preferably near the ingress end, and in such position that the spray from the nozzles strikes the pellet bed without striking the walls of the mixer. A conveyor line 21 receives the oiled pellets from mixer 17 and delivers a portion of them to line 22 for passage to storage through conveyor line 23. Conveyor line 24, along with conveyor line 26, serves to return a portion of the oiled pellets to the pellet mill via line 11 and hopper 12. A proportioning device 27, at the juncture of line 22 and line 24, serves to proportion the flow of oiled pellets through recycle line 24 and the conveyor product line to storage (lines 22 and 23).

In another modification of the invention, the flow of pellets is directed through line 29 to screening device 31, which separates the oiled pellet stream from mixer 17 into two streams of pellets in accordance with size by means of the size of openings in the screen. Device 31 may be a shaker screen or a rotary-type screen, the only requirement being that the screen operate to separate the oiled pellets into a stream of smaller pellets and a stream of larger pellets. Either one of the streams of pellets may be recycled to the pellet mill, depending upon the size of pellet desired as product. In most instances, the stream of small pellets is returned via lines 32 and 26 to the pellet mill. The other stream of pellets from screening device 31 is passed through line 33 to conveyor line 23.

It is to be understood that any of the conveyor lines shown in the drawing may represent belt conveyors in the form of U-belts, flat belts, or zipper belts, as well as auger-type conveyors, gravity conveyors or chutes, etc., which will transport the pellets without excessive destruction or disintegration of the same.

The control of the proportion of oil impregnated in the pellets is effected by means of an arrangement of devices including weigh conveyor 41, in line 14, and weigh conveyor 42, in line 26, which are connected in actuating arrangement with differential weight controller 43, which in turn is operatively connected with motor valve 44 in oil line 18. Controller 43 integrates the difference in weights of the pellets passing over weigh conveyors 41 and 42 and actuates motor control valve 44 so as to pass the desired amount of oil through line 18 and sprays 19 into the pellet bed in mixer 17. Any type of weigh conveyor may be utilized in the pellet streams, but a weigh belt conveyor which includes a pneumatic air transmitter, such as a Conveyo-Flo belt conveyor, is preferred. This type of device actuates controller 43 by means of pneumatic pressure, and controller 43 also operates motor valve 44 by means of pneumatic pressure. These instruments are connected in the usual manner with an air supply line. Other instrumentation may be utilized, such as that which operates electrically to perform the same function as the pneumatic type.

In one embodiment of the invention, flow-control device 27 is operated automatically by motor valve 46 under the control of weigh conveyor 42 so as to pass a constant weight of pellets in a given time over the weigh conveyor and through conveyor lines 24 and 26. In this type of operation, it is not absolutely essential to utilize weigh conveyor 42 to actuate controller 43, in which case controller 43 operates motor valve 44 in response to variations in the weight of pellets passing over weigh conveyor 41, of course, with allowance for the constant weight of pellets passing over weigh conveyor 42. Such a method of operation depends upon the efficiency or accuracy of weight proportioning device 27; such a system depends upon passage of a constant weight of pellets over weigh conveyor 42.

Figure 2 shows an arrangement of apparatus which provides for passing the pellet stream from mixer 17 through screening device 31, which separates the pellets into two streams in accordance with a given size grading. In the modification shown, the stream of smaller pellets is passed through a conveyor line 51 to an automatic feeder device 52, which feeds, within a very small percentage of error, a constant weight of pellets per unit of time to line 26 for recycle to the pellet mill. Device 52 may be a belt conveyor or vibratory feeder which feeds a controlled and regulatable weight of pellets per unit of time. In the modification of the invention, the recycled pellets may be passed through conveyor line 53 so as to bypass weigh conveyor 42, or the recycled pellets may still be passed over weigh conveyor 42 and this device may be utilized to actuate controller 43. With the arrangement shown in Figure 2, screening device 31 is operated so as to feed more than the required amount of recycle pellets to the hopper of feeder 52 and the overflow is taken off through line 56, which may connect with line 23 by means of conveyor line 57. Where desired, the pellets may be recovered directly from line 56 as a product of the process, or for any use desired.

Figure 3 illustrates one type of proportioning device which is suitable for receiving pellets from line 21 in hopper 61 and passing the received pellets through downwardly sloping chute 62 and through branch lines 22 and 24. Proportioning pellet flow to the arms of the Y-shaped proportioning device is effected by means of a gate device 63 which is pivoted at 64 and extends to the outside of the chute. The gate is operated by motor valve 46 by means of air under the control of weigh conveyor 42.

In instances where the carbon black pellets are to be incorporated in an aqueous dispersion of rubberlike material or an elastomer, it is advantageous to incorporate in the oil a small amount of a wetting or dispersing agent, such as one or more of those listed by Van Antwerpen in "Surface-Active Agents," published in Industrial and Enginering Chemistry, vol. 33, No. 1, pages 16–22, January 1941; and vol. 35, No. 1, pages 107–117 and 126–130, January 1943. Agents soluble in the oil being sprayed should be selected.

Numerous modifications of the invention can be made within the scope of the preceding disclosure. It should be realized that the illustrative details set forth herein are merely explanatory and should not be construed as unnecessarily limiting the invention.

I claim:

1. A process for pelleting carbon black comprising feeding dry, loose carbon black to a pellet mill and forming pellets therein; passing the pellets thus formed to a separate mixing zone and spraying oil at a controlled rate onto the pellets therein; recycling a portion of the oiled pellets to said pellet mill.

2. The process of claim 1 in which the pellets recycled are within the range of 15 to 75 weight per cent of the pellets egressing from the mixing zone.

3. The process of claim 1 including weighing the pellets passing to the mixing zone; weighing the recycled pellets; and regulating the rate of flow of oil to the mixing zone in proportion to the difference between the weights obtained.

4. The process of claim 1 in which the effluent pellet stream from the mixing zone is divided into a product stream and a recycle stream by regulating a flow-control zone in said effluent pellet stream in response to the weight of pellets passing through a weighing zone on the recycle line.

5. The process of claim 4 in which the proportioning zone includes a screening zone which separates the pellets into a stream of small and a stream of larger pellets.

6. The process of claim 4 in which the proportioning zone includes a screening zone which passes a pellet stream of small pellets to recycle and a stream of larger pellets to product storage.

7. The process of claim 1 including recycling a constant weight of pellets; weighing the pellets passing through the mixing zone; and regulating the flow of oil to the mixing zone in proportion to the difference between the two weights.

8. Apparatus for manufacturing carbon black pellets comprising a horizontally elongated cylindrical carbon black pellet mill having an inlet and an outlet for black; a pellet mixer connected at one end to the outlet of said mill by means of a conveyor line; a pellet product conveyor line connected to the other end of said mixer; a valved oil line leading into said mixer, having a spraying means for spraying oil onto pellets therein; and a pellet recycle conveyor line connected with said product conveyor line and with the inlet to said pellet mill.

9. The apparatus of claim 8 including means in said product line for regulating the proportion of pellets flowing to said recycle conveyor line.

10. The apparatus of claim 8 including in said product line a screening device which separates the pellet product stream into a stream of small pellets and a stream of larger pellets.

11. The apparatus of claim 10 in which an outlet from the under side of the screening device is connected with the recycle conveyor line for recycling a stream of smaller pellets.

12. The apparatus of claim 10 in which an outlet from the upper side of the screening device is connected to the recycle conveyor line for recyling a stream of larger pellets.

13. The apparatus of claim 9 in which said means comprises an inverted Y-type chute having an adjustable gate therein for proportioning the flow of pellets to the downstream arms of the Y.

14. The apparatus of claim 8 including an automatic weighing device in the conveyor line between said mill and said mixer; an automatic weighing device in said pellet recycle conveyor line; and a weight differential controller connected with each of said weighing devices so as to be actuatable thereby, and also connected in actuating arrangement with a motor valve in said oil line for controlling the rate of flow of oil therein in proportion to the difference in the weights passing over said weighing devices.

15. The apparatus of claim 8 including a feeding device between said pellet product conveyor line and said pellet recycle conveyor line, which feeds a constant weight of pellets to said recycle line; an automatic weighing device in said conveyor line between said mill and said mixer; a weight controller connected with said weighing device so as to be actuatable thereby, and also connected in actuating arrangement with a motor valve in said oil line.

References Cited in the file of this patent

UNITED STATES PATENTS

| | | |
|---|---|---|
| 2,131,686 | Heller et al. | Sept. 27, 1938 |
| 2,327,016 | Carney | Aug. 17, 1943 |
| 2,503,361 | Studebaker | Apr. 11, 1950 |
| 2,642,343 | Studebaker | June 16, 1953 |